(12) United States Patent
Snijder

(10) Patent No.: US 8,996,983 B2
(45) Date of Patent: Mar. 31, 2015

(54) DEVICE AND A METHOD FOR ANNOTATING CONTENT

(75) Inventor: Freddy Snijder, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 1169 days.

(21) Appl. No.: 12/300,144

(22) PCT Filed: May 7, 2007

(86) PCT No.: PCT/IB2007/051697
§ 371 (c)(1),
(2), (4) Date: Nov. 10, 2008

(87) PCT Pub. No.: WO2007/132395
PCT Pub. Date: Nov. 22, 2007

(65) Prior Publication Data
US 2009/0164462 A1    Jun. 25, 2009

(30) Foreign Application Priority Data
May 9, 2006  (EP) .................................. 06113731

(51) Int. Cl.
*G06F 17/30* (2006.01)
(52) U.S. Cl.
CPC .... *G06F 17/30038* (2013.01); *G06F 17/30722* (2013.01)
USPC ............ 715/230; 715/205; 715/234; 715/255
(58) Field of Classification Search
CPC .................... G06F 17/30038; G06F 17/30722
USPC ............ 715/230, 205, 234, 255; 707/3, 104.1
See application file for complete search history.

(56) References Cited

U.S. PATENT DOCUMENTS 6,970,860 B1    11/2005  Liu et al.
2002/0103873 A1*  8/2002  Ramanathan et al. ........ 709/206
(Continued)

FOREIGN PATENT DOCUMENTS

CN    1680939 A    10/2005
EP    1505529 A1   2/2005
(Continued)

OTHER PUBLICATIONS

Context-Aware Metadata Creation in a Heterogeneous Mobile Environment by Olga Volgin presented at NOSSDAV'05, Jun. 13-14, 2005, Stevenson, Washington, USA.*
(Continued)

*Primary Examiner* — William Bashore
*Assistant Examiner* — Nathan Shrewsbury

(57) ABSTRACT

A device and a method for annotating content is provided. The device may comprise a means to analyze the content (150) and generate a first output (205) based upon the analysis of the content, a means to generate an annotation request (230), a means to communicate (130), the means to communicate being adapted to distribute the annotation request to at least one other device and to receive an annotation result from the at least one other device and a means to combine (240) the first output and the annotation result to provide an improved output. By combining multiple independent results of content analysis algorithms from different devices, possibly based upon background different knowledge a higher quality result is provided for the annotation.

23 Claims, 10 Drawing Sheets

(56) References Cited

U.S. PATENT DOCUMENTS

| | | |
|---|---|---|
| 2002/0129057 A1 | 9/2002 | Spielberg |
| 2003/0113109 A1 | 6/2003 | Pelletier |
| 2005/0015712 A1 | 1/2005 | Plastina et al. |
| 2005/0015713 A1* | 1/2005 | Plastina et al. ............. 715/500.1 |
| 2005/0027664 A1 | 2/2005 | Johnson et al. |
| 2005/0097451 A1 | 5/2005 | Cormack et al. |
| 2005/0209989 A1 | 9/2005 | Albornoz et al. |
| 2007/0003113 A1* | 1/2007 | Goldberg ...................... 382/118 |
| 2008/0263076 A1* | 10/2008 | Duffield et al. ............... 707/102 |

FOREIGN PATENT DOCUMENTS

| | | |
|---|---|---|
| EP | 1566752 A2 | 8/2005 |
| JP | 2005513530 A | 5/2005 |
| JP | 2005309512 A | 11/2005 |
| WO | 2004063920 A2 | 7/2004 |

OTHER PUBLICATIONS

The Structure of Collaborative Tagging Systems, by Scott Golder published by HP Labs, 2005.*

CDDB, World's Largest Online CD Music Database, Debuts New Web Site (available http://www.gracenote.com/company_info/press/1999/1999042700/) gracenote.com Berkeley, CA (Apr. 27, 1999).*

Olga Volgin, et al: Context-Aware Metadata Creation in a Heterogeneous Mobile Environment, ACM 1-58113-987-X/5/0006, [Online] Jun. 13-14, 2005, XP002451832, Washington, USA.

Jan Nesvadba, et al: Real-Time and Distributed AV Content Analysis System for Consumer Electronics Networks, Multimedia and Expo, 2005, ICME 2005, IEEE International Conf.On Amstaerdam, The Netherlands, Jul. 6, 2005, pp. 1549-1552, XP010843966 ISBN: 0-7803-9331-7.

Dowell R D et al: The Distributed Annotation Systems, BMC Bioinformatics 2001, vol. 2, 2001, p. 7, XP002452892 ISSN: 1471-2105.

Marc Davis, et al: Towards Context-Aware Face Recognition, Proceedings of 13th Annual ACM International Conference on Multimedia (MM2005) in Singapore, ACM Press, pp. 483-486 2005.

Ara V. Nefian, et al: Face Recognition Using an Embedded HMM, 1999, Face Recognition Method, pp. 1-6.

Risto Sarvas, et al: Metadata Creation System for Mobile Images, Proceedings of the Second International Conference on Mobile Systems, Applications, (MobiSys2004) Jun. 6-9, 2004, Boston Massachusetts, ACM Press, pp. 36-48.

Erik Murphy-Chutorian I, et al: Analysis of a Biologicaly-Inspired Systems for Real-time Object Recognition, Cognitive Science Online, vol. 3, No. 2, pp. 1-14 2005.

I. Cohen, et al: Facial Expression Recognition from Video Sequences, IEEE International Conference on Multimedia and Expo (ICME'02) vol. II pp. 121-124, Lausanne, Switzerland Aug. 2002.

Golder, Scott A. et al: The Structure of Colaborative Tagging Systems, Journal of Information Science, 2006, Information Dynamics Lab HP Labs.

Semantic Learning and Analysis of Multimedia , Slam Project IBM, Research http;//www.research.ibm.com/slam/.

* cited by examiner

DEVICE AND A METHOD FOR ANNOTATING CONTENT

FIELD OF THE INVENTION

The invention relates to a device for annotating content.

The invention further relates to a method for annotating content.

The invention further relates to a program element.

The invention further relates to a computer-readable medium.

BACKGROUND OF THE INVENTION

There is a trend of increasing electronics miniaturization, leading to the development of devices that may have more processing power, allowing them to become smarter. Furthermore, the trend of further technology integration will allow devices to integrate more and more technologies such as wireless networking and sensor capabilities into affordable products. The combination of these two trends will allow devices to become smart device, context aware and intelligently interacting with other such devices in a network (ad-hoc, fixed or otherwise). Such devices can be portable as well as stationary devices. Portable and stationary device makers tend to differentiate their device products, in both form and function, from other such products in the market. This will leave the user with even more such devices at home and on-the-move.

One use of such powerful devices is for the storage and/or rendering of personal content. In using such devices metadata of personal content, such as own created photos and videos, is important to users to be able to, for instance, easily organize, browse and find back their content. To manually annotate such content is a very laborious task for users. This is especially so since the amount of content produced, both commercially and personally, is ever increasing. Therefore, it is becoming virtually impossible to properly annotate all newly created content. Solutions are required that alleviate the users from such arduous tasks and enable them to start enjoying the content.

Whilst a lot of solutions, using content analysis or otherwise, are being developed for the purpose of helping the user to annotate content automatically. None are satisfactory. When considering personal content the following types of metadata are generally found to be important:

Why was the content created? What is the "event", e.g. Summer holidays

Who appears in the created picture or video? E.g. my wife

When was the content created? E.g. July, Summer

Where was the content created? E.g. In Italy

Further, types of metadata related to concepts and object present in the content, such as "happy", "beach" and "tree" can also be of importance to the user.

Concerning the recognition of who appears in photos and videos a lot of literature is available; see for instance Marc Davis, Michael Smith, John Canny, Nathan Good, Simon King, and Rajkumar Janakiraman, "Towards Context-Aware Face Recognition," Proceedings of 13th Annual ACM International Conference on Multimedia (MM 2005) in Singapore, ACM Press, 483-486, 2005. This article specifically targets context-aware face recognition in personal photos created using mobile phones. A further example is provided in Ara V. Nefian, Monson H. Hayes III, 1999, "Face recognition using an Embedded HMM", which is a face recognition method.

To determine where a content item was created, at creation time, it is widely known that a Global Positioning System (GPS) can be used. Further, there are also systems developed that try to analyse the content created, to infer where the place is captured by the content. For instance, in Risto Sarvas, Erick Herrarte, Anita Wilhelm, and Marc Davis, "Metadata Creation System for Mobile Images," Proceedings of the Second International Conference on Mobile Systems, Applications, and Services (MobiSys2004) in Boston, Mass., ACM Press, 36-48, 2004, a created image may be uploaded to a server to be compared with other images. From such an analysis it can be derived, for instance, that an image was taken at the "Campanile" tower on the UC Berkeley campus, USA.

Furthermore, there also many efforts to detect concepts and objects, see for instance, Erik Murphy-Chutorianl, Sarah Aboutalib, Jochen Triesch, "Analysis of a Biologically-Inspired System for Real-time Object Recognition", Cognitive Science Online, Vol. 3.2, pp. 1-14, 2005 and I. Cohen, N. Sebe, A. Garg, M. S. Lew, T. S. Huang, "Facial Expression Recognition from Video Sequences", IEEE International Conference on Multimedia and Expo (ICME'02), vol II, pp. 121-124, Lausanne, Switzerland, August 2002.

However, even given all of the work being done in content analysis it has been found that content analysis cannot provide 100% accurate annotation results. Whilst there are also efforts to incorporate user feedback and learning algorithms it remains an issue that a user will be required to provide significant amounts of feedback.

The inventors recognising this problem devised the present invention.

BRIEF SUMMARY OF THE INVENTION

The present invention seeks to improve the quality of annotation of content.

Accordingly, there is provided, in a first aspect of the present invention, a device for annotating content, the device comprising a means to analyse the content and generate a first output based upon the analysis of the content, a means to generate an annotation request, a means to communicate, the means to communicate being adapted to distribute the annotation request to at least one other device and to receive an annotation result from the at least one other device and a means to combine the first output and the annotation result to provide an improved output.

The device may analyse the content locally using a content analyser, however, the results will, of course, be no better than the best algorithms available. However, by requesting at least one further device to also perform content analysis, a second independent annotation result is determined. By combining the results of content analysis performed locally on the device with the independent results of content analysis performed and returned by at least one further device the individual and independent results may be combined to provide a combined and improved output.

According to a second aspect of the invention a method for annotating content is provided, the method comprising the method steps of analysing the content and generating a first output based upon the analysis of the content, generating an annotation request, communicating the annotation request to at least one other device and receiving an annotation result from the at least one other device and combining the first output and the annotation result to provide an improved output.

According to a third aspect of the invention a system for annotating content is provided, the system comprising a plurality of devices for annotating content, each device of the plurality of devices comprising a means to analyse the content and generate a first output based upon the analysis of the content, a means to generate an annotation request, a means to communicate, the means to communicate being adapted to distribute the annotation request to at least one other device and to receive an annotation result from the at least one other device and a means to combine the first output and the annotation result to provide an improved output.

According to a fourth aspect of the invention a program element directly loadable into the memory of a programmable device is provided, comprising software code portions for performing, when said program element is run on the device, the method steps of analysing content to be annotated and generating a first output based upon the analysis of the content, generating an annotation request, communicating the annotation request to at least one other device and receiving an annotation result from the at least one other device and combining the first output and the annotation result to provide an improved output.

According to a fifth aspect of the invention a computer-readable medium directly loadable into the memory of a programmable device is provided, comprising software code portions for performing, when said code portions are run on the device, the method steps of analysing content to be annotated and generating a first output based upon the analysis of the content, generating an annotation request, communicating the annotation request to at least one other device and receiving an annotation result from the at least one other device and combining the first output and the annotation result to provide an improved output.

In one embodiment a user interface may be provided, the user interface may be adapted to present the annotation request to a user and to receive feedback on the annotation request from the user and a means to combine further combines the feedback from the user to provide the improved output. This provides a fall back scenario for situations when the improvement in the quality of the annotation provided by the improved output is still not judged to be sufficient.

In a further embodiment a means to communicate may be adapted to receive external annotation requests from a further device and to transmit the feedback from the user to the further device. This provides a device to offer a service to further devices in a network to request and provide user feedback even though the further devices may not have suitable user interface capabilities to request feedback from the user themselves.

In another embodiment an annotation centre manager may be provided, the annotation centre manager may comprise a queue comprising a plurality of outstanding annotation requests for the user and a means to select a selected outstanding annotation request from the queue of outstanding annotation requests wherein the annotation centre manager is communicatively coupled to a user interface to communicate the selected outstanding annotation request to the user interface and to receive the feedback from the user interface. This allows annotation requests to be collected and presented to a user at a suitable moment.

In yet another embodiment an annotation centre manager may further comprise a means to determine obsolete outstanding annotation requests which are outstanding annotation requests made obsolete by the feedback from the user and a means to delete the obsolete outstanding annotation requests from the queue and wherein a means to communicate is further adapted to communicate the feedback to originators of the obsolete outstanding annotation requests. This allows annotation requests that were queued to be analysed taking into account the feedback from the user and annotation requests which may have become obsolete based on the feedback from the user may be removed from the queue and communicated back to the originator of the obsolete annotation requests. This also reduces the amount of user interaction required, by removing the need to answer obsolete annotation requests.

In an embodiment a means to communicate may be further adapted to receive a message identifying a further device as an annotation centre manager, transmit external annotation requests to the annotation centre manager identified and to receive external feedback from a user from the annotation centre manager identified and a means to combine may further combine the external feedback from the user to provide the improved output. This allows a further device to present and receive user feedback on behalf of the device and this is useful when the further device has more powerful user interface capabilities.

In another embodiment a means to detect that the user is in the vicinity of the device may be provided along with a means to identify the device as an annotation centre manager in a network of devices based upon detection that the user is in the vicinity of the device and a means to communicate may be further adapted to receive external annotation requests from the network of devices. This allows annotation requests to be directed to a local device to the user. This also allows feedback to be gathered from the user in a fast and efficient manner.

In another embodiment a means for storing the improved output may be provided. Storing the improved output allows the metadata relating to the content to be permanently of an improved quality.

In a further embodiment a means to combine may further comprise a confidence level determination unit, the confidence level determination unit may be adapted to determine a first confidence level of the first output, the first confidence level indicating the confidence that the first output is correct, determine a second confidence level of the annotation result, the second confidence level indicating the confidence that the annotation result is correct and wherein a means to combine may be adapted to further combine the first output and the annotation result to provide an improved output based upon the first confidence level and the second confidence level. This allows a confidence level to be determined for each result of content analysis, even in situation wherein the content analysis algorithm cannot provide a confidence level itself.

In a further embodiment a device according to the invention may be realized as at least one of the group consisting of a Set-Top-Box device, a digital video recording device, a network-enabled device, a conditional access system, a portable audio player, a portable video player, a mobile phone, a DVD player, a CD player, a hard disk based media player, an Internet radio device, a computer, a television, a public entertainment device, a memory stick and an MP3 player. However, these applications are only exemplary.

In another embodiment an annotation request may be presented to a user and feedback on the annotation request may be received from the user and a method step of combining may further combine the feedback from the user to provide the improved output. This provides a fall back scenario for situations when the improvement in the quality of the annotation provided by the improved output is still not judged to be sufficient.

In an embodiment external annotation requests may be received from a further device and feedback from the user may be transmitted to the further device. This provides a service to further devices in a network to request and provide user feedback even though the further devices may not have suitable user interface capabilities to request feedback from the user themselves.

The data processing required according to the invention can be realized by a computer program, that is to say by software, or by using one or more special electronic optimization circuits, that is to say in hardware, or in hybrid form, that is to say by means of software components and hardware components. The data processing may also be provided by an external service running on a server.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

Figure 1:
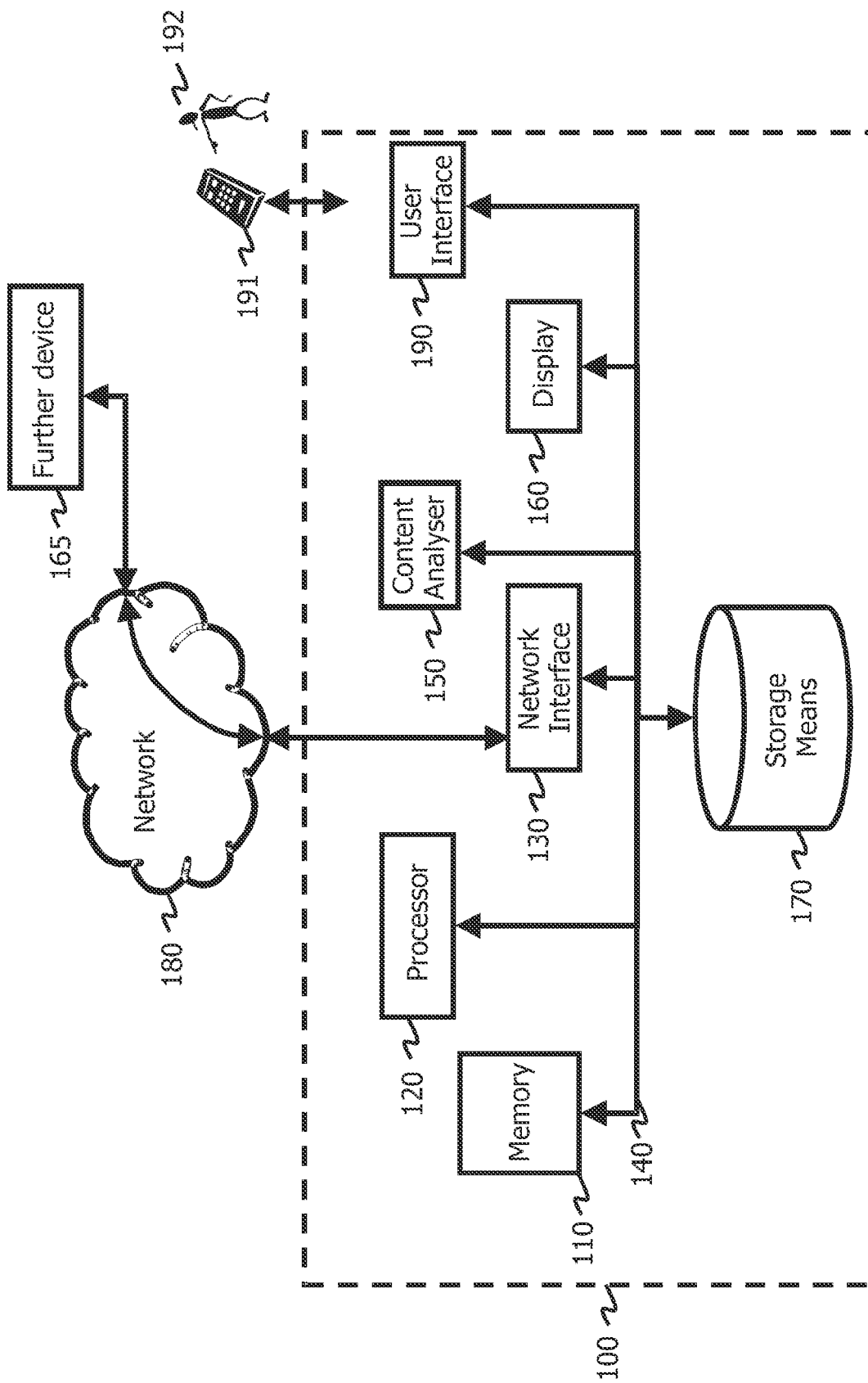
FIG. 1 illustrates a system diagram of a device according to an embodiment of the invention.

The Figures are schematically drawn and not true to scale, and the identical reference numerals in different Figures refer to corresponding elements. It will be clear for those skilled in the art, that alternative but equivalent embodiments of the invention are possible without deviating from the true inventive concept, and that the scope of the invention will be limited by the claims only.

DETAILED DESCRIPTION OF THE INVENTION

FIG. 1 illustrates an embodiment of the invention. A device 100 is provided which may reside in a network 180. The network 180 may be a locale network or the Internet. A further device 165 may also reside in the network. The device 100 may be an autonomous device, enabling device 100 to work without explicit control of other devices and to control who or what is accessing and using the functionality and data of the device 100. This is of special importance to portable devices that need to work in different environments, some of which may be outside the users own (home/private) network. The device 100 may comprise a processor 120 for executing machine-readable code as is commonly applied in present day devices. The device 100 may also comprise a bus 140 for interconnecting system components within the device 100. For example, the processor 120 may use a memory 110 to run code and/or store data. The device may also comprise a means to communicate, such as network interface 130, allowing the device 100 to communicate with the further device 165 or other devices.

The network interface 130 may be a network interface such as a wired Ethernet interface or it may also be wireless in nature. For example, the network interface 130 may be a WiFi, Bluetooth, mobile phone or other suitable network interface. A display 160 may be provided for rendering content to a user 192. The user 192 may interact with the device 100 suing a remote control 191 and a user interface 190. The user interface 190 may of course also make use of the display 160. Other forms of user interaction, beyond a remote control may also be suitable, such as a keyboard, a touch screen, a mouse or other point device. A storage means 170 may also be provided for storing content, metadata and intermediate and/or final results of any processing steps. The storage means may be volatile or non-volatile and may be for example, SRAM, DRAM or FLASH memory, a hard disk drive or an optical drive. It is to be noted the content may be accessed from the storage means 170, but equally possible is that the content be accessed via the network interface 130. In such a case the storage means 170 is entirely optional.

A content analyser 150 may be provided to analyse content accessible by the device, either locally or via the network 180. Analysis of the content may provide more metadata or metadata of an improved quality. This is especially relevant when considering personal content where the following types of metadata are generally found to be important:

Why was the content created? What is the "event", e.g. Summer holidays

Who appears in the created picture or video ? E.g. my wife

When was the content created? E.g. July, Summer

Where was the content created? E.g. In Italy

The user 192 also values metadata relating to higher-level concepts and objects contained within the content, for example, the concepts of "happy", "beach" and "tree" have been found to be of importance to the user. As already noted when concerning the recognition of who appears in photos and videos a lot of literature is available. For example, "Towards Context-Aware Face Recognition," Proceedings of 13th Annual ACM International Conference on Multimedia (MM 2005) in Singapore, ACM Press, 483-486, 2005 specifically targets context-aware face recognition in personal photos created using mobile phones. A further example is provided in Ara V. Nefian, Monson H. Hayes III, 1999, "Face recognition using an Embedded HMM", which is a face recognition method.

Other important metadata aspects are related to determining where a content item was created, at creation time, it is widely known that a Global Positioning System (GPS) can be used. Further, there are also systems developed that try to analyse the content created, to infer where the place is captured by the content. For instance, in "Metadata Creation System for Mobile Images," Proceedings of the Second International Conference on Mobile Systems, Applications, and Services (MobiSys2004) in Boston, Mass., ACM Press, 36-48, 2004, a created image may be uploaded to a server to be compared with other images. From such an analysis it can be derived, for instance, that an image was taken at the "Campanile" tower on the UC Berkeley campus, USA.

Furthermore, there also many efforts to detect concepts and objects, see for instance, Erik Murphy-Chutorianl, Sarah Aboutalib, Jochen Triesch, "Analysis of a Biologically-Inspired System for Real-time Object Recognition", Cognitive Science Online, Vol. 3.2, pp. 1-14, 2005 and I. Cohen, N. Sebe, A. Garg, M. S. Lew, T. S. Huang, "Facial Expression Recognition from Video Sequences", IEEE International Conference on Multimedia and Expo (ICME'02), vol II, pp. 121-124, Lausanne, Switzerland, August 2002.

All of these forms of content analysis are useful, however, they are not reliable enough to work on their own. Therefore there are also efforts to incorporate user feedback. This feedback can be used to make annotations where the content analysis method results have low confidence and to improve the content analysis algorithms (online learning). For example, the "Semantic Learning and Analysis of Multimedia", SLAM project, IBM Research, http://www.research.ibm.com/slam/. The known solutions mostly focus on how to use feedback for online learning of content analysis algorithms.

A completely different way for users to get their content annotated is through "collaborative tagging", for example in Scott A. Golder and Bernardo A. Huberman, "The Structure of Collaborative Tagging Systems", to appear in the Journal of Information Science (2006), Information Dynamics Lab, HP Labs. In this solution users may add annotations to any content uploaded to a website.

In the following annotation means not only the creation of metadata but also the creation of user added information. Annotations may be optionally be stored to assist in future browsing or search actions.

It remains the case that user feedback is only reliable for the explicit questions posed to a user and any inferences taken from responses of a user will not be completely reliable. Furthermore, due to the wide variety of processing platforms, i.e. devices, and varying capabilities of devices the extent to which the results of any single content analysis algorithm can be trusted will be limited.

Figure 2:
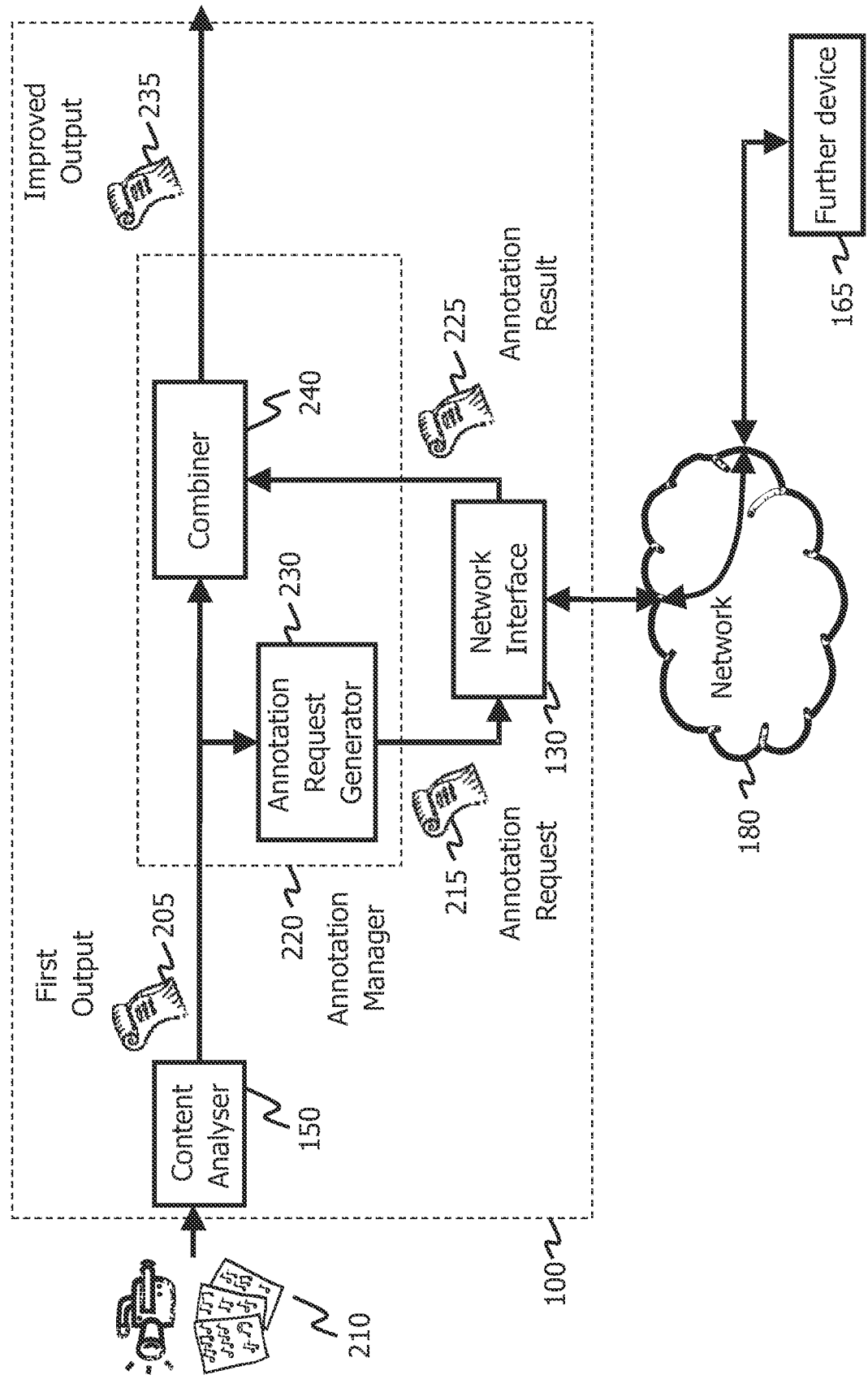
FIG. 2 illustrates in more detail a device according to an embodiment of the invention.

In FIG. 2 an embodiment is shown in more detail that improves the quality of output from content analysis. Content 210 to be annotated is made available to the device 100. The content 210 may be photos, audio, video or some other data form. The content analyser 150 analyses the content 210 using a known algorithm, for example, face detecting algorithm. The content analyser 150 generates a first output 205 with the results of the content analysis step. The first output 205 may comprise only annotations or annotations and a measure of the confidence in the annotations. The actual annotations and any measure of the confidence are specific to each any every content analysis algorithm, so some form of standardisation of, especially, the measure of the confidence may be useful. The first output 205 may comprise, for example, the number of faces, who the faces represent, etc. Many other content analysis algorithms are also possible that focus on video features, such as colour etc, or audio features, such as volume, tempo etc.

The first output 205 is communicated to an annotation manager 220. The annotation manager 220 may comprises an annotation request generator 230 and a combiner 240. The annotation request generator 230 receives the first output 205 and generates an annotation request 215 based upon the first output 205. Optionally, the annotation request generator 230 may only provide a link to the content 210 in the annotation request 215 such that the further device 165 may analyse the content 210 from scratch. The annotation request 215 is communicated internally to the network interface 130, from where it is distributed within the network 180 to other devices, such as, further device 165.

In this example, the further device 165 analyses the content 210 according to the annotation request 215. The annotation request 215 may be a general request to analyse the content 210 from scratch, or it may be a specific request to analyses a certain aspect of the content 210. For example, a specific request may a request to analyse only the faces detected in a photo. After performing the analysis, the further device 165 will reply to the annotation request 215 with an annotation result 225. The independent annotation result may be performed by a different content analysis algorithm or be analysed based upon different background knowledge. The annotation result 225 may comprise only the annotation metadata or optionally also a measure of the confidence in the annotation metadata.

The device 100 receives the annotation result 225 from the further device 165 via the network interface 130. The combiner 240 receives the annotation result 225 and combines it with the first output 205. The combiner 240 analyses the two independent results and judges the quality or confidence in one or both results to provide an improved output 235. The improved output 235 may be any known combination or function of the first output 205 and the annotation result 225.

Figure 3:
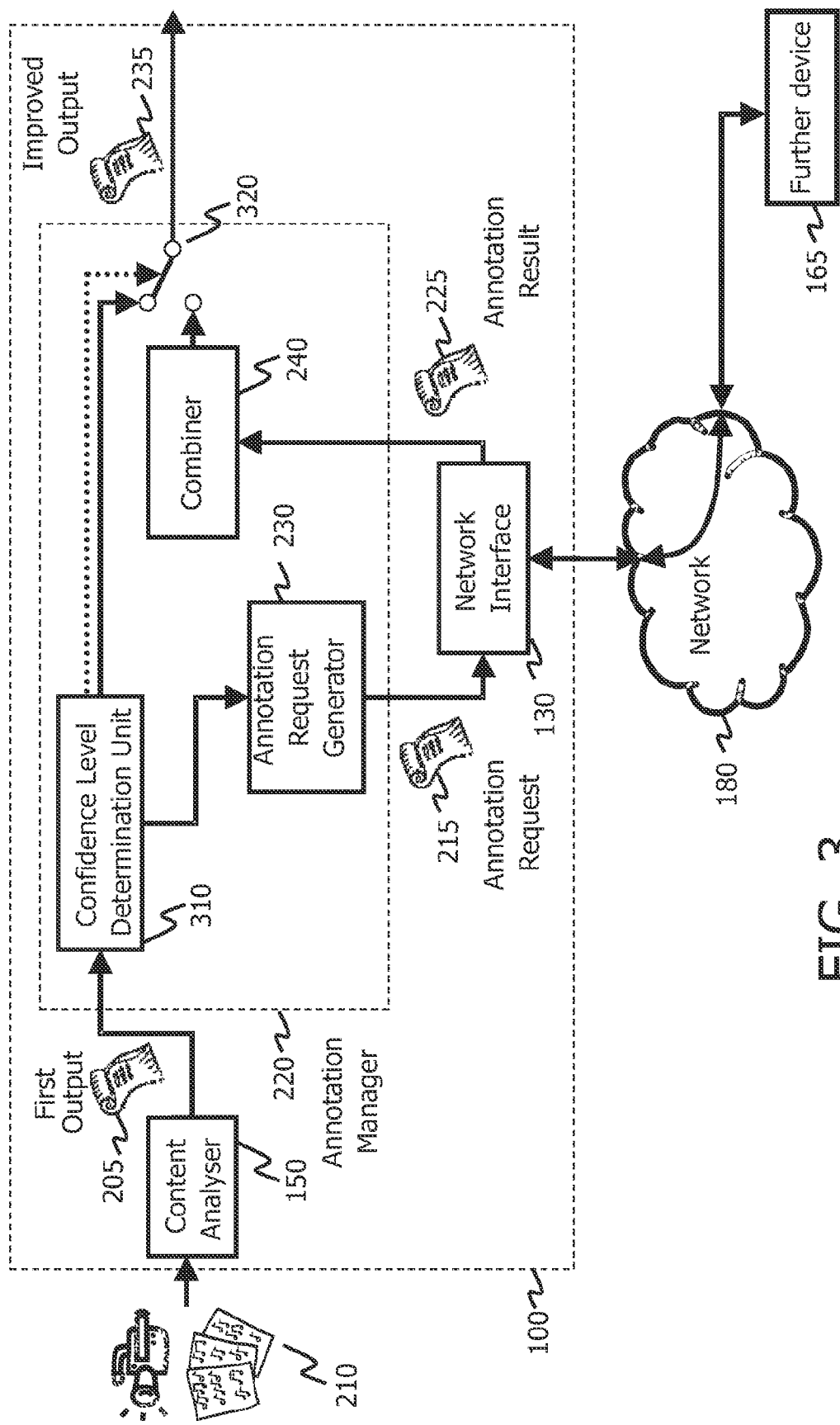
FIG. 3 illustrates in an embodiment of the invention wherein a confidence level in the results of the content analysis is determined.

In another embodiment as shown in FIG. 3 the annotation manager 220 may comprise a confidence level determination unit 310. The confidence level determination unit 310 is shown to intercept the first output 205 from the content analyser 150. For clarity it is noted that the content analyser 150 may be a hardware component or a software module running on processor 120. If the content analyser 150 does not provide any measure of confidence in the first output 205, the confidence level determination unit 310 may estimate the confidence level using historical information. Based upon the level of confidence in the first output 205 the confidence level determination unit 310 may decide to trigger the annotation request generator 230 to generate the annotation request 215 or pass the first output 205 directly to the improved output 235 via switch 320. Should the path be chosen making use of the annotation request 215 then the annotation request 215 may be processed normally and communicated to the improved output 235 via the combiner 240 and switch 320, when set in the lower position.

Figure 4:
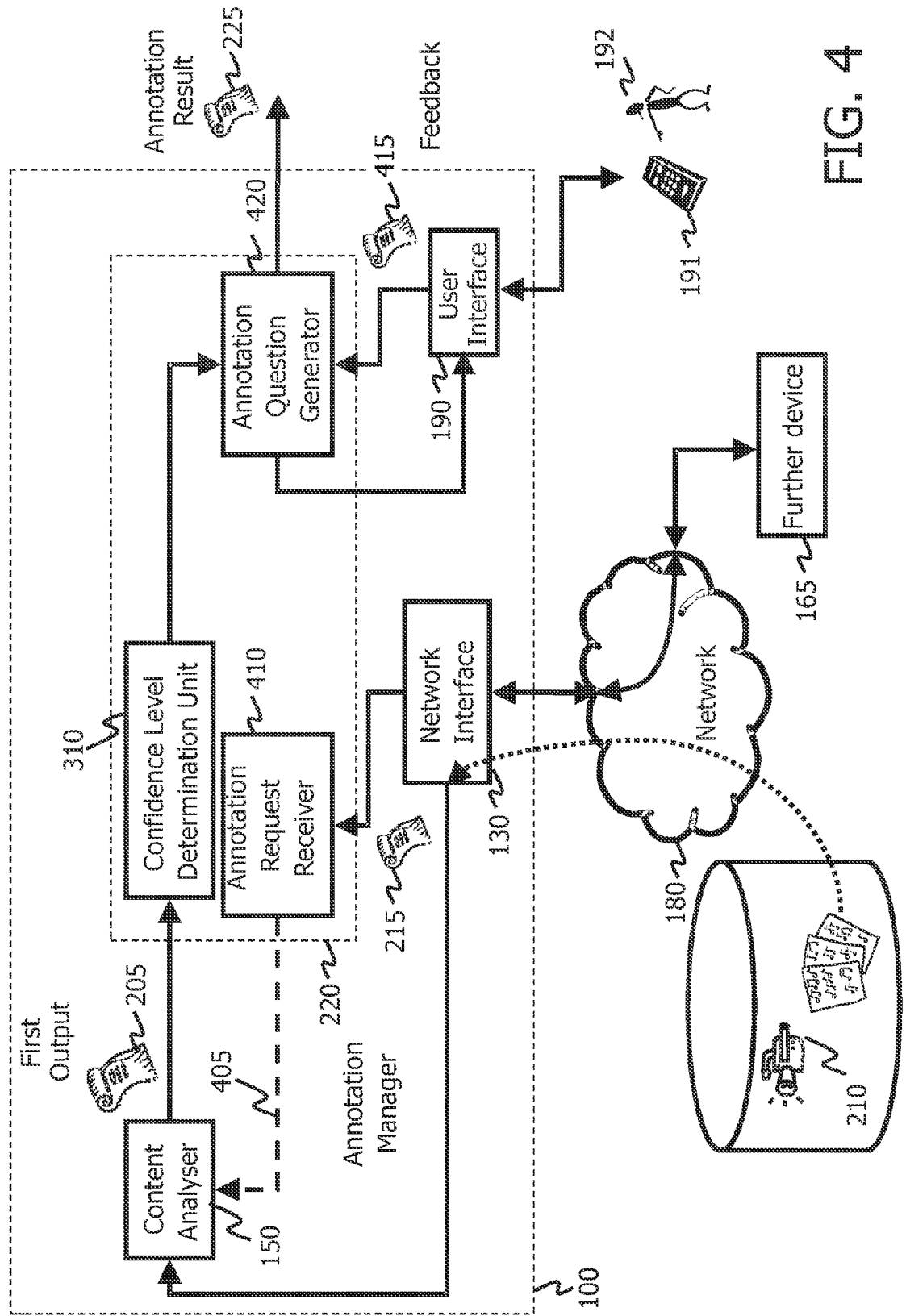
FIG. 4 illustrates in an embodiment of the invention wherein feedback from a user is requested based upon a confidence level in the results of the content analysis.

In FIG. 4 a further embodiment is shown. In FIG. 4 the annotation manager 220 may comprise an annotation request receiver 410 capable of receiving annotation requests 215 from devices on the network 180. The annotation request receiver 410 may be capable of initiating the content analysis of the content 210, using the content analyser 150. The content 210 may be remotely located, as shown in FIG. 4. The content 210 may also be stored on the further device 165. The annotation manager 220 may further comprise an annotation question generator 420. The annotation question generator 420 may be communicatively coupled to the confidence level determination unit 310 and be triggered by the result of the analysis performed by the confidence level determination unit 310 to generate a question for the user 192. The display 160 and the user interface 190 may be used for this purpose. The user 192 may provide feedback 415. Based upon the feedback 415 the annotation question generator 420 generates an annotation result 225 of a high confidence level. The annotation result 225 may be communicated back to an originator of the annotation request 225. This communication may be performed by the network interface 130, though this is not shown in FIG. 4.

Figure 5:
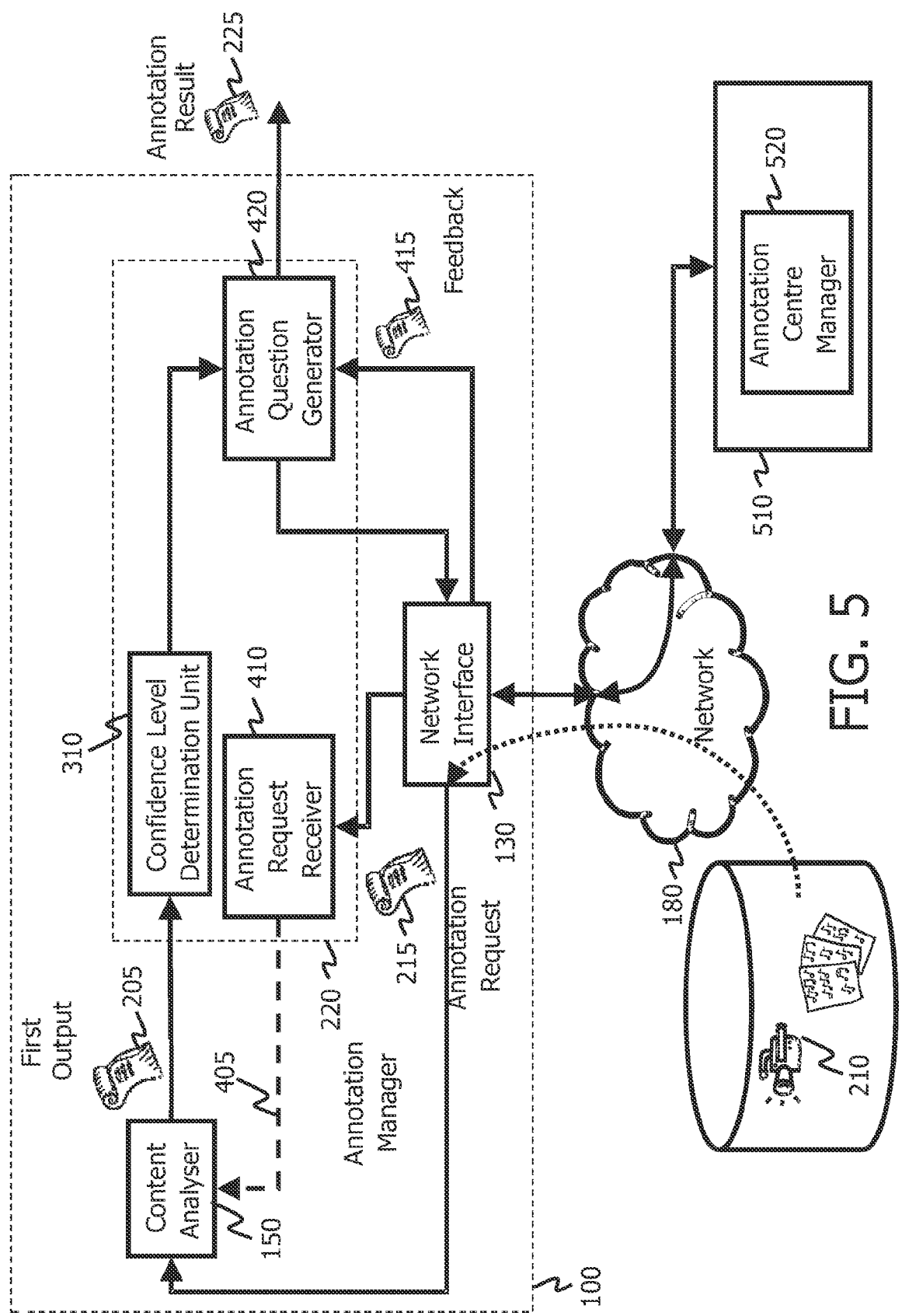
FIG. 5 illustrates in an embodiment of the invention wherein annotation is requested from a further device based upon a confidence level in the results of the content analysis.

In FIG. 5 an embodiment is shown wherein an annotation question may be communicated via network interface 130 to a remote device 510 comprising an annotation centre manager 520. The annotation centre manager 520 displays the annotation question to the user in a similar manner as described in FIG. 4. The feedback 415 is communicated from the annotation centre manager 520 of the remote device 510 via the network 180 to the annotation question generator 420 of the device 100. The annotation result 225 is then generated by the annotation question generator 420. Again the annotation result 225 may be communicated to other devices via the network interface 130.

Figure 6:
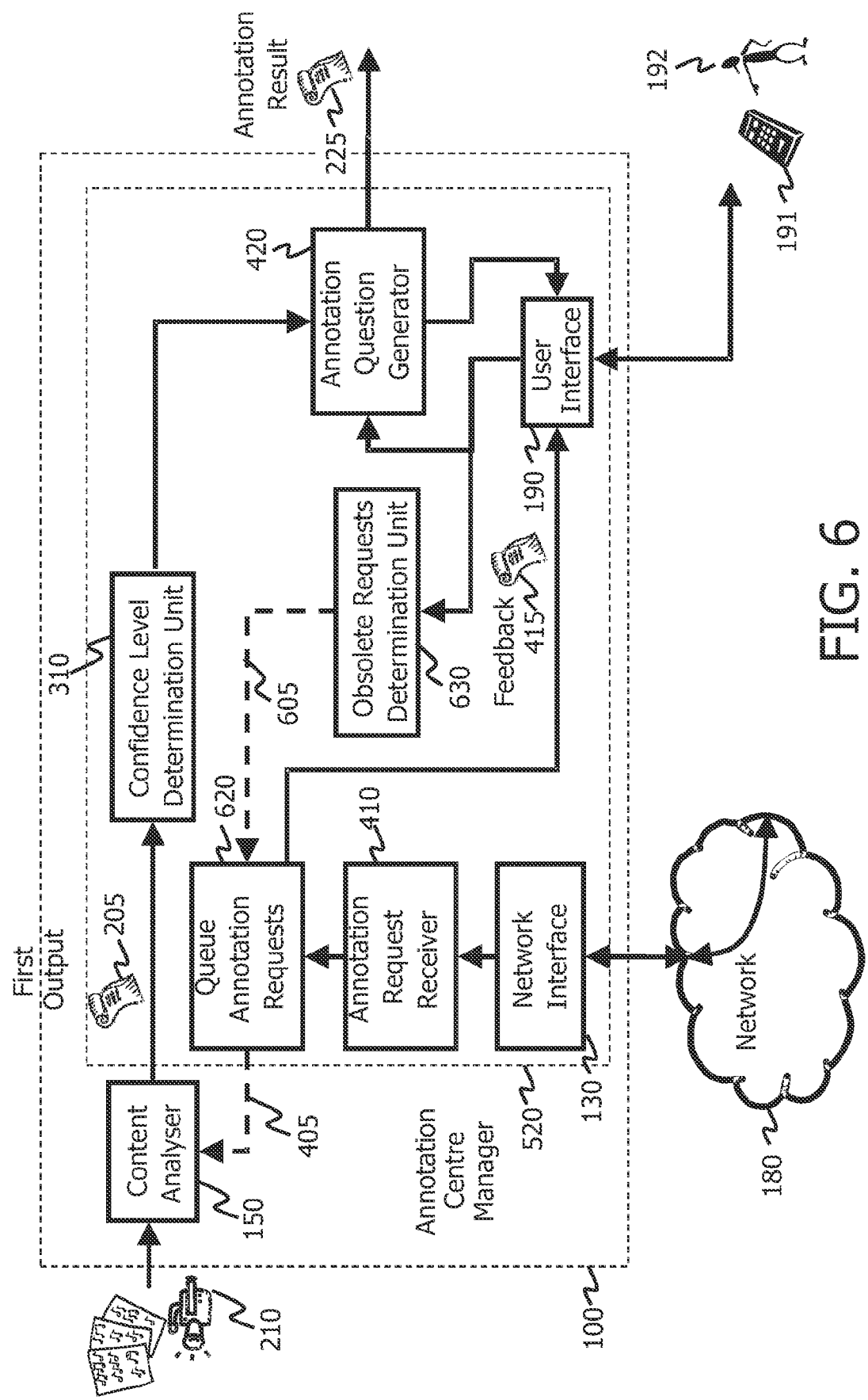
FIG. 6 illustrates in an embodiment of the invention wherein annotation requests are queued and obsolete annotation requests may be deleted from the queue based upon feedback from a user.

In FIG. 6 an embodiment is shown where device 100 may act as an annotation centre manager 520 in the network 180. The annotation centre manager 520 may comprise an annotation request receiver 410 and an annotation request queue 620. This allows annotation requests to be collected until the user 192 is ready to give feedback. The annotation request queue 620 may trigger the user interface 190 to directly request feedback from the user 192. Alternatively, the annotation request queue 620 may trigger the content analyser 150 to analyse the content 210. Based upon the feedback 415 from the user 192 an obsolete requests determination unit 630 may determine which requests in the annotation request queue 620 are now obsolete taking into account the feedback 415 provided by the user 192. For example, if after the feedback 415 has been analysed that the face of "John" may now be recognised with a high confidence. Any other annotation requests relating to the face of "John" do not need to be forwarded to the user 192. Therefore, the workload required from the user 192 is reduced.

Figure 7:
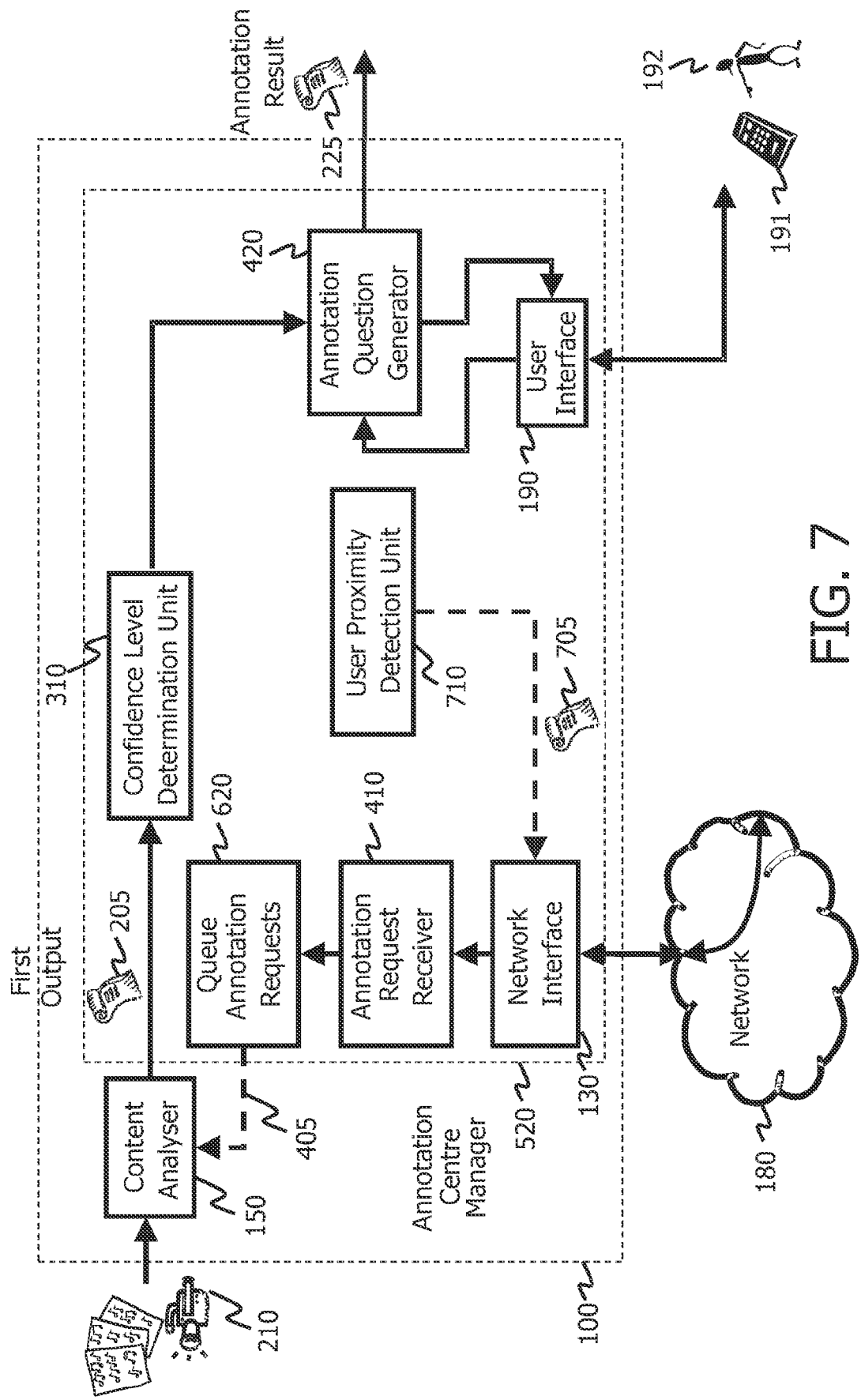
FIG. 7 illustrates in an embodiment of the invention wherein the proximity of a user to the device is detected such that the device may inform further devices that it may receive annotation requests requiring feedback from a user.

In FIG. 7 another embodiment of device 100 operating as an annotation centre manager 520 is shown. The annotation centre manager 520 may also comprise a user proximity detection unit 710. The user proximity detection unit 710 may use any known means to detect that the user 192 is in close proximity to the device 100. For example, the user proximity detection unit 710 may use a camera, a thermal detector etc. The user proximity detection unit 710 may also infer the proximity of the user 192 by noting user interaction and the time elapsed since such interaction occurred. For example, if the user 192 is operating, or has very recently operated, the device 100 then the user 192 will probably be within close proximity to the device 100. The user proximity detection unit 710 may then inform other devices in the network 180, via an indication 705, that it should become the current central annotation centre manager and all annotation requests or questions requiring user feedback should be directed to device 100.

Figure 8:
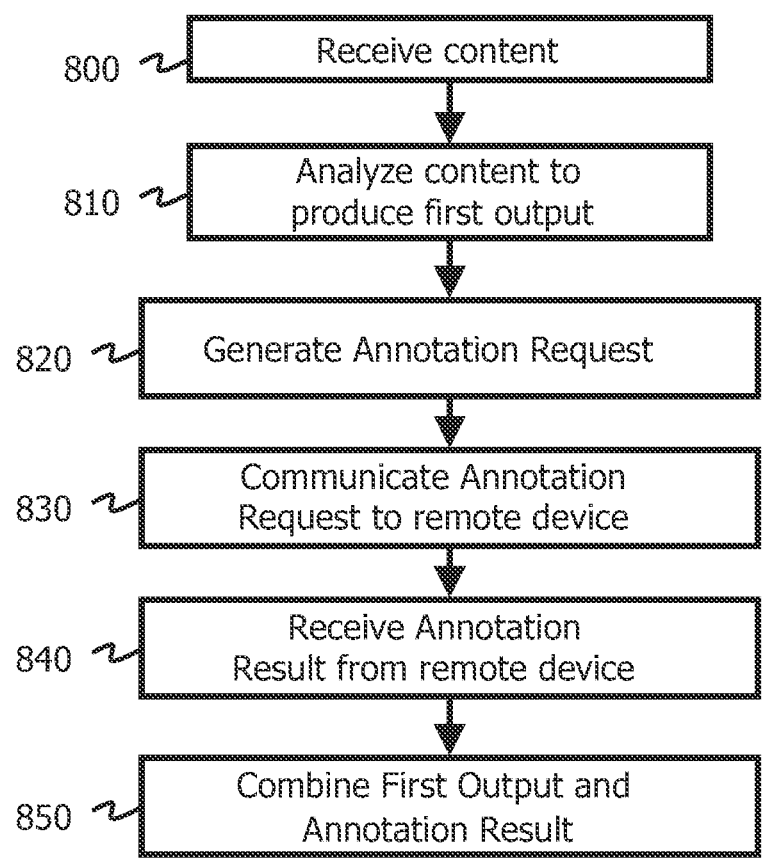
FIG. 8 illustrates a flowchart used in an embodiment of the invention.

In FIG. 8 a flowchart is shown indicating a method for implementing an embodiment of the invention on the processor 120 of device 100. In step 800 content 210 is received, or at least made accessible. In step 810 the content 210 is analysed locally using a content analysis algorithm and the first output 205 is produced. At step 820 annotation request 215 is generated and at step 830 the annotation request 215 is communicated to a further device 195. At step 840 annotation result 225 is received from the further device 195. At step 850 the first output 225 and the annotation result 225 are combined to provide an improved output 235.

Figure 9:
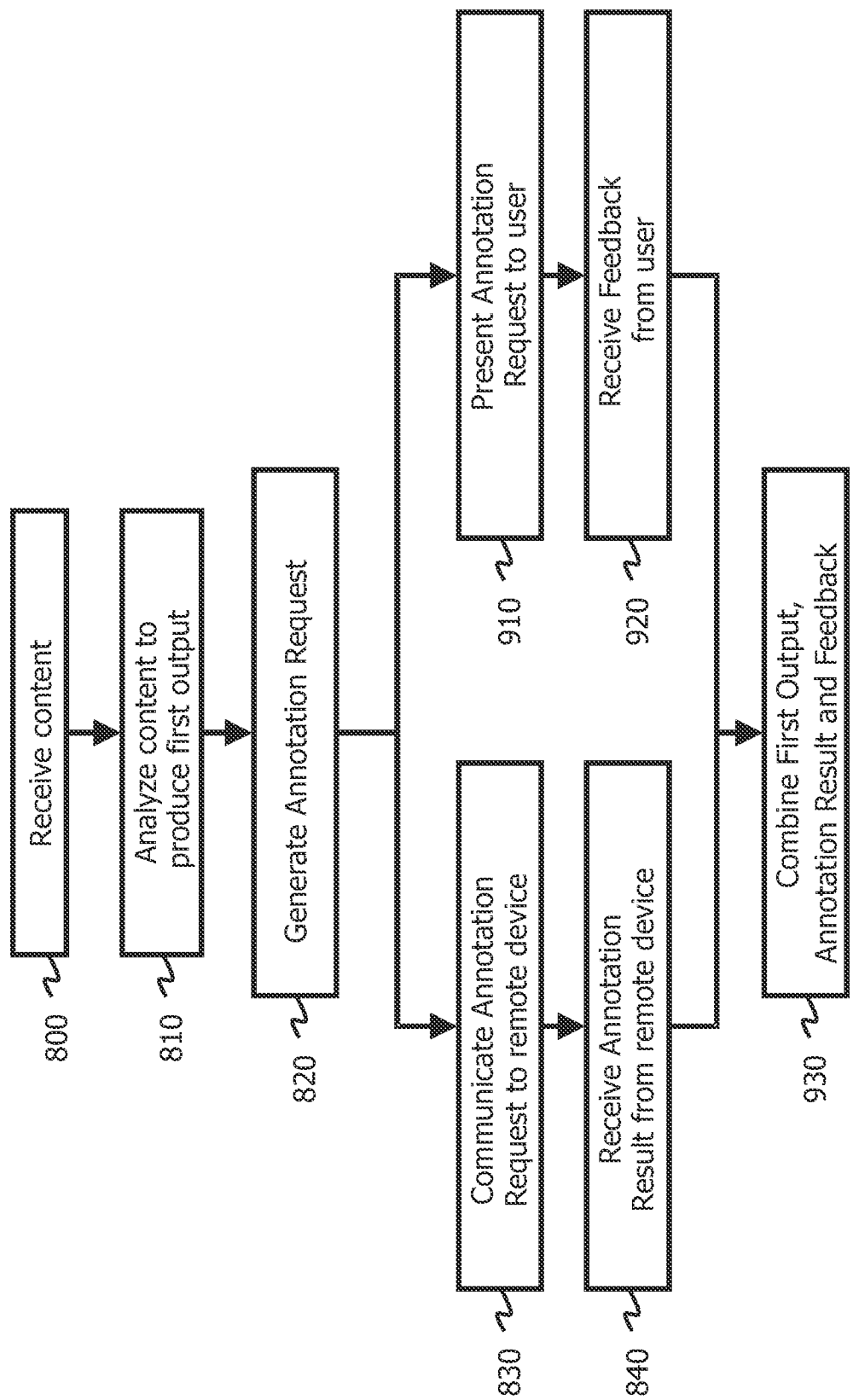
FIG. 9 illustrates a second flowchart used in an embodiment of the invention.

In FIG. 9 a second flowchart is shown indicating a further method for implementing an embodiment of the invention on the processor 120 of device 100. After step 820 two parallel paths are possible. The first path encompasses method steps as described in the text of FIG. 8, namely steps 830 and 840. The second path presents the annotation request 215 as a question to the user 192 in step 910. The presentation to the user 192 may be on a local device, for example, device 100, or the further device 165. The exact location of the user 192 is not of importance. It is however important that the user 192 provides the feedback 415 in step 920. In step 930 the first output 205, the annotation result 225 and the feedback 415 are all combined to provide a very high quality annotation as an improved output 235.

Figure 10:
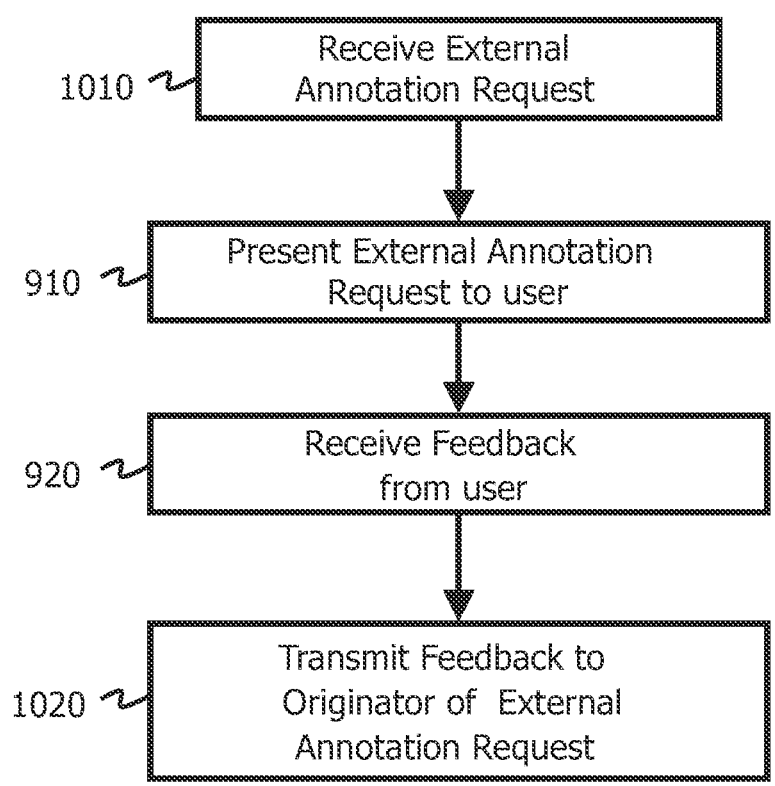
FIG. 10 illustrates a third flowchart used in an embodiment of the invention.

In FIG. 10 a third flowchart is shown indicating a further method for implementing an embodiment of the invention on the processor 120 of device 100. In the embodiment of FIG. 10 at step 1010 external annotation requests may be received from a remote device. Step 910 and step 920 are identical to those steps described in FIG. 9, but operate on the external annotation request. Again, the presentation to the user 192 may be on a local device, for example, device 100, or the further device 165. At step 1020 the feedback 415 may be transmitted back to the originator of the external annotation request. This allows annotation requests to be transferred to a location close to the user 192.

In summary the invention discloses methods and devices for annotating content. The device may comprise a means to analyse the content and generate a first output based upon the analysis of the content, a means to generate an annotation request, a means to communicate, the means to communicate being adapted to distribute the annotation request to at least one other device and to receive an annotation result from the at least one other device and a means to combine the first output and the annotation result to provide an improved output. By combining multiple independent results of content analysis algorithms from different devices, possibly based upon background different knowledge a higher quality result is provided for the annotation.

It should be noted that the above-mentioned embodiments illustrate rather than limit the invention, and that those skilled in the art will be capable of designing many alternative embodiments without departing from the scope of the invention as defined by the appended claims. Furthermore, any of the embodiments described comprise implicit features, such as, an internal current supply, for example, a battery or an accumulator. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device for annotating content, the device comprising:
    a means to analyse the content at the device and generate a first output comprising at least annotations based upon the analysis of the content;
    a means to generate an annotation request from the device over a network to at least one other device configured to analyze the content, said annotation request comprising that at least one other device independently analyze the content to provide an independent annotation result;
    a means to communicate, the means to communicate being adapted to distribute the annotation request over said network to the at least one other device and to receive said independent annotation result from the at least one other device; and
    a means to combine the first output from the device and the independent annotation result from the at least one other device to provide an improved output, wherein the means to combine further comprises a confidence level determination unit, the confidence level determination unit being adapted to:

determine a first confidence level of the first output, the first confidence level indicating the confidence that the first output is correct;

determine a second confidence level of the annotation result, the second confidence level indicating the confidence that the annotation result is correct; and wherein the means to combine is further adapted to combine the first output and the annotation result to provide an improved output based upon the first confidence level and the second confidence level.

2. The device of claim 1 further comprising a user interface adapted to present the annotation request to a user and to receive feedback on the annotation request from the user and wherein the means to combine further combines the feedback from the user to provide the improved output.

3. The device of claim 2 wherein the means to communicate is further adapted to receive external annotation requests from a further device and to transmit the feedback from the user to the further device.

4. The device of claim 2 further comprising an annotation centre manager, the annotation centre manager comprising:

a queue comprising a plurality of outstanding annotation requests for the user; and a means to select a selected outstanding annotation request from the queue of outstanding annotation requests wherein the annotation centre manager is communicatively coupled to the user interface to communicate the selected outstanding annotation request to the user interface and to receive the feedback from the user interface.

5. The device of claim 4 wherein the annotation centre manager further comprises:

a means to determine obsolete outstanding annotation requests which are outstanding annotation requests made obsolete by the feedback from the user; and a means to delete the obsolete outstanding annotation requests from the queue wherein the means to communicate is further adapted to communicate the feedback to originators of the obsolete outstanding annotation requests.

6. The device of claim 1 wherein the means to communicate is further adapted to:

receive a message identifying a further device as an annotation centre manager;

transmit external annotation requests to the annotation centre manager identified; and to receive external feedback from a user from the annotation centre manager identified and wherein the means to combine further combines the external feedback from the user to provide the improved output.

7. The device of claim 3 further comprising:

a means to detect that the user is in the vicinity of the device;

a means to identify the device as an annotation centre manager in a network of devices based upon detection that the user is in the vicinity of the device and wherein the means to communicate is further adapted to receive external annotation requests from the network of devices.

8. The device of claim 1 further comprising a means for storing the improved output.

9. The device of claim 1 realized as at least one of the group consisting of: a Set-Top-Box device; a digital video recording device; a network-enabled device; a conditional access system; a portable audio player; a portable video player; a mobile phone; a DVD player; a CD player; a hard disk based media player; an Internet radio device; a computer; a television; a public entertainment device; a memory stick; and an MP3 player.

10. A method for annotating content, the method comprising the method steps of:

analysing the content and generating a first output comprising at least annotations based upon the analysis of the content;

generating an annotation request over a network to at least one other device configured to analyze the content, said annotation request comprising that at least one other device independently analyze the content to provide an independent annotation result;

communicating the annotation request to at least one other device over said network and receiving the independent annotation result from the at least one other device; and combining the first output and the independent annotation result to provide an improved output, further comprising:

determining a confidence level of the first output, indicating that the confidence of the first output is correct;

determining a confidence level of the annotation result, indicating that the confidence of the annotation result is correct;

wherein the combination of the first output and the independent annotation result to provide said improved output is based upon the first confidence level and the second confidence level.

11. The method of claim 10 further comprising the method steps of:

presenting the annotation request to a user and receiving feedback on the annotation request from the user; and in the method step of combining further combining the feedback from the user to provide the improved output.

12. The method of claim 11 further comprising the method steps of:

receiving external annotation requests from a further device; and transmitting the feedback from the user to the further device.

13. A system for annotating content, the system comprising a plurality of devices for annotating content, each device of the plurality of devices comprising:

a means to analyse the content and generate a first output comprising at least annotations based upon the analysis of the content, a means to generate an annotation request over a network to at least one other device configured to analyze the content, said annotation request comprising that at least one other device independently analyze the content to provide an independent annotation result, a means to communicate, the means to communicate being adapted to distribute the annotation request to at least one other device over said network and to receive an annotation result from the at least one other device; and a means to combine the first output and the independent annotation result to provide an improved output, wherein the means to combine further comprises a confidence level determination unit, the confidence level determination unit being adapted to:

determine a first confidence level of the first output, the first confidence level indicating the confidence that the first output is correct;

determine a second confidence level of the annotation result, the second confidence level indicating the confidence that the annotation result is correct; and wherein the means to combine is further adapted to combine the first output and the annotation result to provide an improved output based upon the first confidence level and the second confidence level.

14. A non-transitory computer-readable medium directly loadable into the memory of a programmable device, comprising software code portions for performing, when said code portions are run on the device, the medium comprising code for steps of:

analysing content to be annotated and generating a first output by the programmable device comprising at least annotations based upon the analysis of the content;

generating an annotation request from the programmable device over a network to at least one other device configured to analyze the content, said annotation request comprising that at least one other device independently analyze the content to provide an independent annotation result;

communicating the annotation request to at least one other device over said network and receiving an independent annotation result from the at least one other device; and combining the first output and the independent annotation result to provide an improved output, further comprising:

determining a confidence level of the first output, indicating that the confidence of the first output is correct;

determining a confidence level of the annotation result, indicating that the confidence of the annotation result is correct;

wherein the combination of the first output and the independent annotation result to provide said improved output is based upon the first confidence level and the second confidence level.

15. A device for annotating content, the device comprising:
a content analyzer adapted to analyse the content at the device and generate a first output comprising at least annotations based upon the analysis of the content;

an annotation request generator adapted to generate an annotation request from the device over a network to at least one other device configured to analyze the content, said annotation request comprising that at least one other device independently analyze the content to provide an independent annotation result;

a network interface adapted to distribute the annotation request over said network to the at least one other device and to receive said independent annotation result from the at least one other device; and a combiner adapted to combine the first output from the device and the independent annotation result from the at least one other device to provide an improved output, wherein the combiner further comprises a confidence level determination unit, the confidence level determination unit being adapted to:

determine a first confidence level of the first output, the first confidence level indicating the confidence that the first output is correct;

determine a second confidence level of the annotation result, the second confidence level indicating the confidence that the annotation result is correct; and wherein the combiner is further adapted to combine the first output and the annotation result to provide an improved output based upon the first confidence level and the second confidence level.

16. The device of claim 15, further comprising a user interface adapted to present the annotation request to a user and to receive feedback on the annotation request from the user and wherein the combiner further combines the feedback from the user to provide the improved output.

17. The device of claim 16, wherein the network interface is further adapted to receive external annotation requests from a further device and to transmit the feedback from the user to the further device.

18. The device of claim 16, further comprising an annotation centre manager, the annotation centre manager comprising:

a queue comprising a plurality of outstanding annotation requests for the user; and a means to select a selected outstanding annotation request from the queue of outstanding annotation requests wherein the annotation centre manager is communicatively coupled to the user interface to communicate the selected outstanding annotation request to the user interface and to receive the feedback from the user interface.

19. The device of claim 18, wherein the annotation centre manager further comprises:

an obsolete request determination unit to determine obsolete outstanding annotation requests which are outstanding annotation requests made obsolete by the feedback from the user; and a means to delete the obsolete outstanding annotation requests from the queue wherein the network interface is further adapted to communicate the feedback to originators of the obsolete outstanding annotation requests.

20. The device of claim 15, wherein the network interface is further adapted to:

receive a message identifying a further device as an annotation centre manager;

transmit external annotation requests to the annotation centre manager identified; and to receive external feedback from a user from the annotation centre manager identified; and wherein the combiner further combines the external feedback from the user to provide the improved output.

21. The device of claim 17, further comprising:
a proximity detection unit to detect that the user is in the vicinity of the device;

a means to identify the device as an annotation centre manager in a network of devices based upon detection that the user is in the vicinity of the device; and wherein the network interface is further adapted to receive external annotation requests from the network of devices.

22. The device of claim 15, further comprising a means for storing the improved output.

23. The device of claim 15, realized as at least one of the group consisting of: a Set-Top-Box device; a digital video recording device; a network-enabled device; a conditional access system; a portable audio player; a portable video player; a mobile phone; a DVD player; a CD player; a hard disk based media player; an Internet radio device; a computer; a television; a public entertainment device; a memory stick; and an MP3 player.

* * * * *